(12) United States Patent
Desai et al.

(10) Patent No.: US 8,990,534 B2
(45) Date of Patent: Mar. 24, 2015

(54) ADAPTIVE RESOURCE MANAGEMENT OF A DATA PROCESSING SYSTEM

(75) Inventors: Lionel D. Desai, San Francisco, CA (US); Neil G. Crane, Palo Alto, CA (US); Damien P. Sorresso, San Francisco, CA (US); Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 13/485,679

(22) Filed: May 31, 2012

(65) Prior Publication Data

US 2013/0326166 A1 Dec. 5, 2013

(51) Int. Cl.
 *G06F 12/02* (2006.01)
 *G06F 9/50* (2006.01)

(52) U.S. Cl.
 CPC ............ *G06F 9/5022* (2013.01); *G06F 9/5016* (2013.01)
 USPC .......................................... 711/167; 711/158

(58) Field of Classification Search
 None
 See application file for complete search history.

(56) References Cited

U.S. PATENT DOCUMENTS

| 7,475,197 | B1 | 1/2009 | Bouge et al. |
| 7,676,636 | B2 | 3/2010 | Cypher et al. |
| 7,826,377 | B2 | 11/2010 | Pepper |
| 8,085,668 | B2 | 12/2011 | Smith et al. |
| 2003/0196062 | A1 | 10/2003 | Valentin et al. |
| 2006/0275934 | A1 | 12/2006 | Pohl et al. |
| 2007/0162706 | A1* | 7/2007 | Savell et al. ................... 711/122 |
| 2008/0075015 | A1 | 3/2008 | Lindvall et al. |
| 2008/0168235 | A1* | 7/2008 | Watson et al. ................ 711/135 |
| 2009/0204975 | A1* | 8/2009 | Hagiu et al. .................. 719/314 |
| 2010/0211754 | A1 | 8/2010 | Crosby et al. |
| 2010/0241958 | A1* | 9/2010 | Fish .............................. 715/702 |
| 2011/0209157 | A1 | 8/2011 | Sumida et al. |

OTHER PUBLICATIONS

PCT Invitation to Pay Additional Fees for PCT/US2013/038679 mailed Aug. 13, 2013.
International Search Report and Written Opinion of the International Searching Authority for corresponding International Application No. PCT/US2013/038679, mailing date Jul. 14, 2014, 17 pages.

* cited by examiner

*Primary Examiner* — Gary Portka
(74) *Attorney, Agent, or Firm* — Blakely, Sokoloff, Taylor & Zafman LLP

(57) ABSTRACT

A method for resource management of a data processing system is described herein. According to one embodiment, a token is periodically pushed into a memory usage queue, where the token includes a timestamp indicating time entering the memory usage queue. The memory usage queue stores a plurality of memory page identifiers (IDs) identifying a plurality of memory pages currently allocated to a plurality of programs running within the data processing system. In response to a request to reduce memory usage, a token is popped from the memory usage queue. A timestamp of the popped token is then compared with current time to determine whether a memory usage reduction action should be performed.

24 Claims, 8 Drawing Sheets

ADAPTIVE RESOURCE MANAGEMENT OF A DATA PROCESSING SYSTEM

FIELD OF THE INVENTION

Embodiments of the present invention relate generally to data processing systems. More particularly, embodiments of the invention relate to resource management of data processing systems.

BACKGROUND

As more and more services are becoming available for small or mobile devices, the number of applications running in a single device has increased significantly. Usually, a small or mobile device is used mostly for certain specific applications, while being equipped with general purpose computing capabilities. For example, it is common to find a mobile phone device that also runs a browser application, a gaming application, and a media player application, etc. On the other hand, a mobile video player device may run a gaming application and/or an email application in addition to a video application. Normally, multiple applications or processes in the same device compete with each other by sharing the same memory resources embedded inside the device.

Usually, a system monitors memory usage by multiple applications to ensure availability of a required capacity of free memory. In some systems, when memory usage reaches a critical level, the system takes memory management actions to increase the size of free memory, such as activating a garbage collection procedure to reclaim allocated memories from applications which are no longer running or less important relative to the foreground application. The system may also target a selected application, such as by simply terminating the selected application. Selecting a target application is usually based on the size or age of an application. As a result, the larger the size, the more likely an application may be terminated when memory usage is tight. However, the priority among applications in a small mobile device may not correspond to the size or age of an application. In addition, terminating an application may result in adverse user experiences on the device as a whole.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
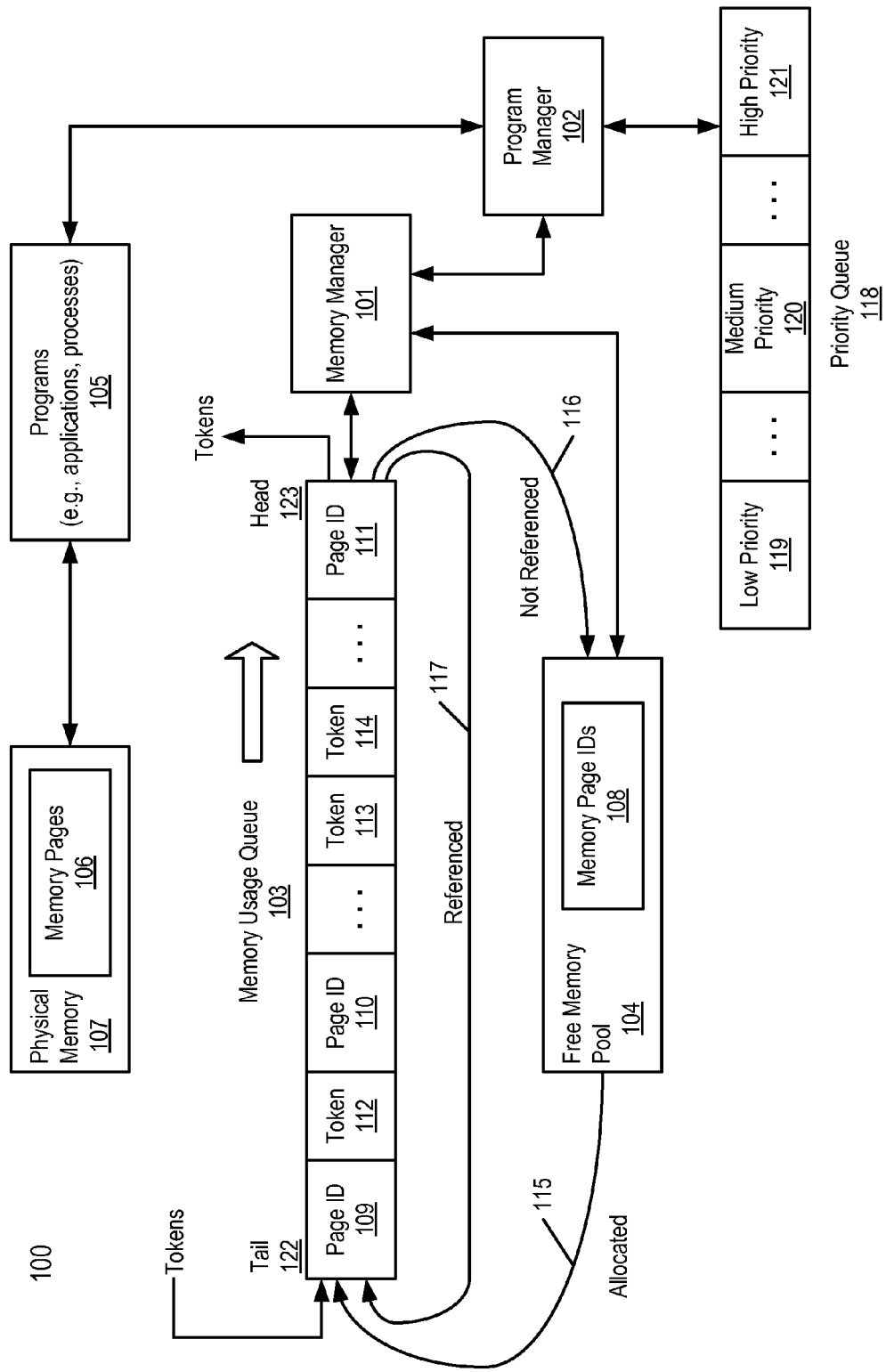
FIG. 1 is a block diagram illustrating a data processing system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for adaptively managing resources of a data processing system are described herein. According to some embodiments, a memory usage queue (e.g., a first-in-first-out (FIFO) buffer) is utilized to track memory usage by storing memory page identifiers (IDs) identifying memory pages that have been allocated to programs such as applications or system processes. A memory page ID may represent an object or a pointer of an object representing the associated memory page itself or a range of contiguous memory pages, where an object may be referenced by one or more processes or applications. The memory usage queue may be implemented in a variety of data structures such as linked lists. When a memory page is allocated to a program, a memory page ID identifying the memory page is pushed or inserted as an item or entry into a tail of the memory usage queue. In addition, according to one embodiment, a token is periodically pushed or inserted into the tail of the memory usage queue, where the token includes a timestamp indicating the time when the corresponding token enters the memory usage queue. When a request for a memory page is received, an item or entry is popped or removed from a head of the memory usage, either being a memory page ID or a token. If the item or entry popped from the memory usage queue is a token, according to one embodiment, the timestamp of the token is compared with the current time. If the difference between the timestamp and the current time is smaller than a predetermined threshold, a memory usage reduction operation is performed on one of the programs (e.g., termination of the program).

According to some embodiments, each of the programs running within the data processing system is associated with a priority. A priority of a program may be determined based on a role or functionality of the program in view of entitlement designed for the program. In one embodiment, a priority queue is utilized to track the priorities of the programs. The priority queue includes multiple priority bands, where each priority band is associated with a different type of tasks (e.g., critical, foreground, background, or suspended priority band). When a program is executed or operates in a different manner, its priority is determined and may be adjusted based on the roles, behaviors, and/or entitlement of the program at the point in time. A program identifier of a program may be inserted or pushed into a tail of a priority band of the priority queue corresponding to the priority being assigned. A program ID may represent a data structure containing information of the associated program, including a process ID, priority, etc. When a request for terminating a program is received, according to one embodiment, processing logic walks through the priority bands of the priority queue, starting from a low priority band to a high priority band. For each priority band being walked through, the processing logic pops a program identifier from a head of the priority band and a memory usage reduction action will be performed on the corresponding program (e.g., termination of a program). If a lower priority band does not contain any program identifier, a next higher priority band is processed.

FIG. 1 is a block diagram illustrating a data processing system according to one embodiment of the invention. System 100 may present any computing device, such as a desktop, laptop, tablet, personal digital assistant (PDA), mobile phone, gaming device, media player, server, etc. Referring to FIG. 1, system 100 includes, but is not limited to, memory manager 101 and program manager 102 for managing memory and programs running within system 100. Memory manager 101 and program manager 102 may be implemented as part of an operating system (OS), which may be a variety of operating systems such as OS X or iOS from Apple Inc., a Windows operating system from Microsoft, or other operating systems (e.g., Linux or Unix).

According to one embodiment, system 100 includes memory usage queue 103 to store memory page IDs identifying memory pages 106 of physical memory 107 that have been allocated to programs 105 running within system 100. Any of programs 105 may be an application (for example, running at a user space of an operating system) or a system process such as a system daemon. Memory pages 106 may be allocated from a pool of memory pages identified by free memory page IDs 108 of free memory pool 104 and assigned to programs 105.

According to one embodiment, when a program is launched and/or requests a memory page, memory manager 101 allocates, via path 115, a memory page from free memory pool 104 to the program and provides the memory page to the program as one of memory pages 106. In addition, memory manager 101 pushes or inserts a memory page ID identifying the memory page as an item or entry into tail 122 of memory usage queue 103 such as memory page IDs 109-111. In addition, according to one embodiment, a token is periodically pushed or inserted into tail 122 of memory usage queue 103 such as tokens 112-114, where the token includes a timestamp indicating the time when the corresponding token enters memory usage queue 103. In one particular embodiment, a token is inserted into memory usage queue 103 every three milliseconds, which may be configurable dependent upon the specific configuration of the system.

When a request for a memory page is received, memory manager 101 pops an item or entry from head 123 of memory usage queue 103, which is either a memory page ID or a token. The request for reducing memory usage may be received when free memory pages represented by memory page IDs 108 of free memory pool 104 drops below a predetermined threshold. If the item popped from head 123 of memory usage queue 103 is a memory page identifier, according to one embodiment, memory manager 101 determines whether a memory page identified by the memory page identifier is currently being referenced by a program (e.g., in a referenced state or dirty state). Memory manager 101 may communicate with other components of the operating system to determine whether a particular memory page is being referenced by a program. If the memory page is not being referenced by any program, the memory page is released back to free memory pool 104 via path 116. If the memory page is currently being referenced by a program, according to one embodiment, the memory page is inserted back to tail 122 of memory usage queue 103.

If the item or entry popped from head 123 of memory usage queue 103 is a token, according to one embodiment, the timestamp of the token is compared with the current time at the point in time. If the difference between the timestamp and the current time is smaller than a predetermined threshold, a memory usage reduction operation is performed on one of the programs (e.g., termination of the program). In this example, memory manager 101 may send a signal or command to program manager 102 to identify and select a program from priority queue 118 that stores program IDs identifying programs 105 in different priorities. The selected program may be terminated or may change to a different operating state to reduce the memory consumption.

In this example, memory usage queue 103 operates as a first-in-first-out (FIFO) queue, where items (e.g., tokens or memory page IDs) are inserted or pushed into tail 122 while items are removed or popped from head 123. When a free memory page is needed or the remaining number of free memory pages 108 in free memory pool 104 drops below a predetermined count, an item, either a token or a memory page ID, is popped from head 123 of memory usage queue. When a free memory page is allocated to a program, the corresponding memory page ID is inserted into tail 122 of memory usage queue. Meanwhile, a token is periodically inserted into tail 122. Thus, an item (e.g., a memory page ID or a token) pushed into tail 122 eventually moves and arrives at head 123 of memory usage queue 103. A memory page ID may represent an object or a pointer of an object representing the associated memory page itself. Memory usage queue 103 may be implemented in a variety of data structures such as linked lists.

Dependent upon how frequently a memory usage reduction request is received, an item may move quickly or slowly within memory usage queue 103. For example, if system 100 has high memory pressure (e.g., less free memory available), the operating system may trigger more requests for reducing memory usage in an attempt to free up memory (e.g., increasing free memory available for allocation). In such a situation, every time a request for reducing memory usage is received, an item is popped from memory usage queue 103 and the tokens pending therein move from tail 122 to head 123 by one slot. If no request for reducing memory usage is received, the items remain at the same positions within memory usage queue 103, although optionally a new token may still be periodically inserted into tail 122 of memory usage queue 103.

Thus, the more frequently requests for memory pages are received, the faster the tokens travel within memory usage queue 103. Fast passage of a token indicates memory pressure, while slow passage indicates that available memory is adequate. Based on whether a token exits memory usage queue 103 prematurely (and, in some embodiments, based on how prematurely the token exits), a notification signal for a memory usage reduction action (e.g., termination of a program to free up memory) is generated and resources are reclaimed. This adaptive process provides a more efficient way to manage memory usages. As memory pressure increases, more and more tokens arrives at head 123 of memory usage queue 103 prematurely, which causes a corresponding increase in the number of notifications for memory usage reduction actions. As more memory becomes available, fewer premature tokens arrive at head 123 of memory usage queue 103, which slows down the number of notifications. In this way, the memory reclamation can become increasingly (or decreasingly) aggressive over time.

Once memory manager 101 determines that a memory usage reduction action is needed, according to one embodiment, memory manager 101 sends a signal or command to program manager 102. In response to the signal or command, program manager 102 selects one of the programs 105 that has the lowest priority and may cause the selected program to perform certain actions to reduce the memory usage of the selected program. Program manager 102 may terminate the selected program and free up the memory used by the program. A memory usage reduction action may include terminating a program, causing a program to gracefully exit, causing a program to self-archive, causing a program to transition into the background, causing a program to reduce memory usage (e.g., closing a window, flushing its cache, and/or alerting a user for permission to reduce resource consumption such as restart, etc.).

According to one embodiment, program manager 102 maintains priority queue 118 that includes multiple priority bands 119-121, from a low priority band to a high priority band. Program identifiers identifying programs 105 running within system 100 are stored in one of the priority bands 119-121. Each of programs 105 is assigned a priority when launched, and this priority can be modified during execution of the program. Based on its priority, the corresponding program identifier is stored in a priority band corresponding to the assigned priority. If during the execution of the program the priority of the program is changed, its program identifier may be moved from one priority band to another priority band. In response to a request from memory manager 101 to perform a memory usage reduction action, program manager 102 selects a program identifier in the lowest priority band (in this example, priority band 119) and terminates the corresponding program identified by the selected program identifier. If the lower priority band does not contain any program identifier, a next higher priority band is examined. Further details concerning priority queue 118 will be described further below.

Note that, memory manager 101 and program manager 102 may be implemented as a single module (e.g., a resource management module); other architectures or structures may also be applied. Also note that throughout this application, memory is utilized as an example of resources available in system 100. However, the techniques described throughout can also be applied to other resource management, such as hardware resources, input/output (IO) resources, or a combination of both software and hardware resources (e.g., virtual machines), etc.

Figure 2:
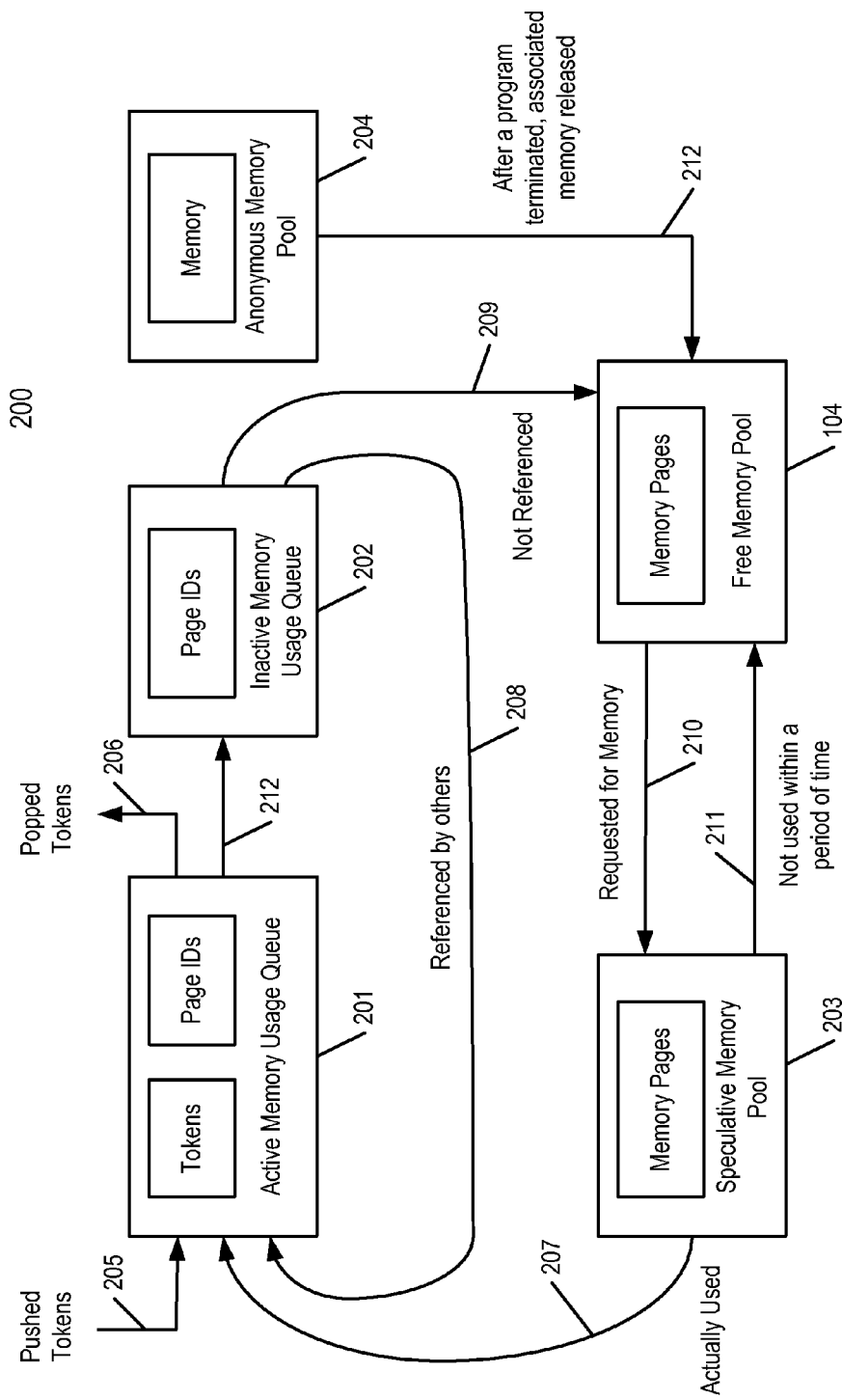
FIG. 2 is a block diagram illustrating a memory management system according to another embodiment of the invention.

FIG. 2 is a block diagram illustrating a memory management system according to another embodiment of the invention. System 200 may be implemented as part of FIG. 1. Referring to FIG. 2, system 200 includes active memory usage queue 201 inactive memory usage queue 202, speculative memory pool 203, and anonymous memory pool 204. Memory usage queues 201-202 may collectively represent memory usage queue 103 of FIG. 1. According to one embodiment, when a request for allocating memory is received, one or more memory pages are allocated from free memory pool 104 and if used to acquire file data are stored in speculative memory pool 203. Anonymous memory pool 204 is used to track memory pages that have been requested and allocated to programs themselves for internal use (instead of accessing a file).

According to one embodiment, when a request for allocating memory is received, more memory pages than requested (e.g., 20 memory pages) may be speculatively allocated from free memory pool 104 via path 210. According to one embodiment, speculative memory pool 203 is used to temporarily retain memory pages that have been brought into the cache via various clustering and read-ahead algorithms, but have not yet been used. Once the memory pages are fully aged or the speculative memory page total exceeds a predetermined limit (e.g., 5% of the available memory), those memory pages may be stolen back for other uses. New memory requests are always first satisfied from free memory pool 104. That is, when memory pages must be stolen from speculative memory pool 203 or inactive queue 202, the memory pages are always released back to free memory pool 104. Threads that are waiting for memory pages always acquire them from free memory pool 104. If a memory page from speculative memory pool 203 in fact is used, the corresponding memory page ID is inserted into a tail of active memory usage queue via path 207. If a memory page stored in speculative memory pool has not been used, for example, for a predetermined period of time (e.g., 5 seconds), the memory page may be released back to free memory pool 104 via path 211.

In addition, according to one embodiment, a token is periodically (e.g., every 3 milliseconds) pushed into the tail of active memory usage queue 201 via path 205. Each token includes a timestamp indicating the time when the token enters active memory usage queue 201. According to one embodiment, when there is a need to free up memory, the memory manager (e.g., memory manager 101) first determines whether there are any memory pages in speculative memory pool that have not been used for while (e.g., 5 seconds). If there is such a memory page or pages, the memory page or pages are then released back to free memory pool 104 via path 211. If there is no memory page available in speculative memory pool 203 or more memory pages need to be freed up, the memory manager pops a memory page ID from the head of inactive memory usage queue 202. If the memory page identified by the popped memory page ID is not currently referenced by a program and is not dirty (e.g., not being referenced by another application or process), the memory page is released back to free memory page pool 104 via path 209. If the memory page is currently referenced by a program, the memory page ID is then inserted into a tail of active memory usage queue 201 via path 208. If the memory page is currently dirty (e.g., currently being referenced by another application or process), it is now written to the backing store associated with it. Once this 'cleaning' operation is completed, if the page still has not been referenced by a program, it is released back to free memory pool 104. If it has been referenced, the memory page ID is inserted into the tail of active memory usage queue 201.

In addition, according to one embodiment, the memory manager pops a memory page ID from a head of active memory usage queue 201 and inserts it into a tail of inactive memory usage queue 202 via path 212. Such a transfer of a memory page ID from active memory usage queue 201 to inactive memory usage queue may be performed in response to a request to free up memory pages. According to one embodiment, the memory manager may determine how many memory pages pending in active memory usage queue 201 compared to the number of memory pages pending in inactive memory usage queue 202. If the ratio of the memory pages between memory usage queues 201 and 202 satisfies a predetermined condition, one or more memory page IDs (e.g., up to 100 memory page IDs) are transferred from active memory usage queue 201 to inactive memory usage queue 202. In one embodiment, the memory manager may maintain an approximately 2:1 ratio between the memory pages in active memory usage queue 201 and those in inactive memory usage queue 202.

According to one embodiment, if a token is popped from the head of active memory usage queue 201 via path 206, the memory manager compares a timestamp of the token with the time at the point in time. If the time difference between the two is below a predetermined threshold (e.g., prematurely exiting), a signal or a command is generated and sent to a program manager to perform a memory usage reduction action as described above. Once a program has been terminated for such a purpose, the memory pages associated with the terminated program may be released from anonymous memory pool 204 back to free memory pool 104 via path 212.

Figure 3:
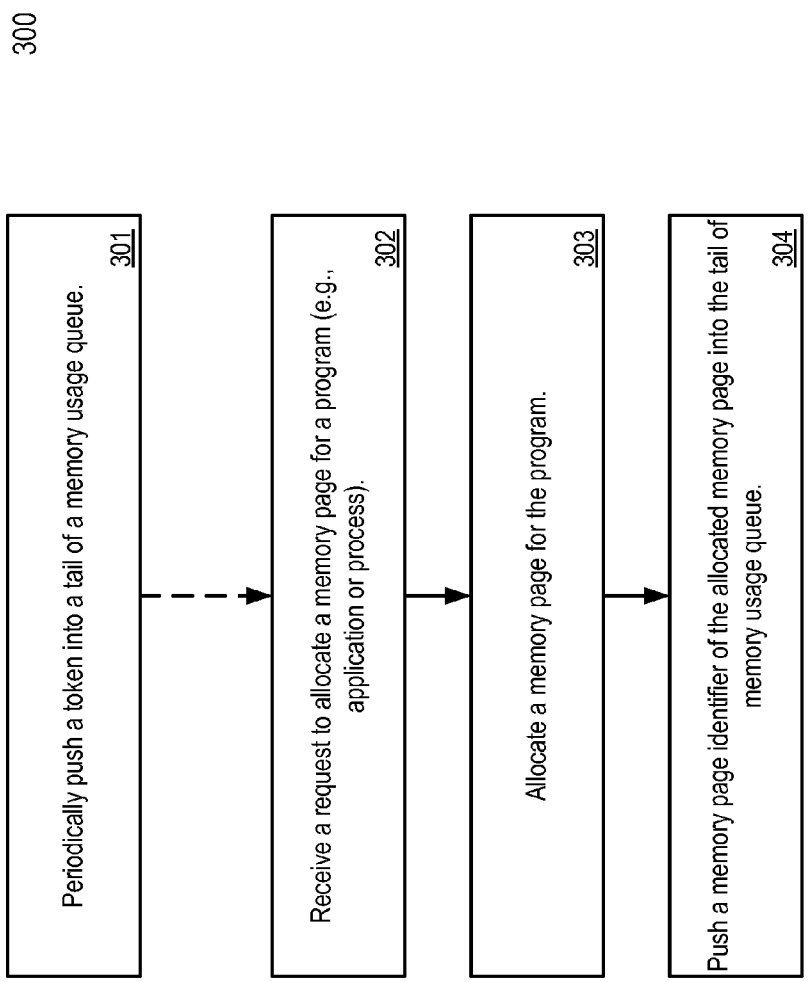
FIG. 3 is a flow diagram illustrating a method for resource management according to one embodiment of the invention.

FIG. 3 is a flow diagram illustrating a method for resource management according to one embodiment of the invention. Method 300 may be performed by system 100 or system 200 of FIGS. 1 and 2. Referring to FIG. 3, at block 301, a token is periodically pushed or inserted into a tail of a memory usage queue. Meanwhile, at block 302, a request to allocate a memory page for a program (e.g., an application or system process) is received. In response to the request, at block 302, a memory page is allocated for the program, for example, from a free memory pool. At block 303, a memory page ID identifying the memory page is pushed into the tail of the memory usage queue. Operations involving block 301 and blocks 302-303 may be performed by separate threads or components independently.

Figure 4:
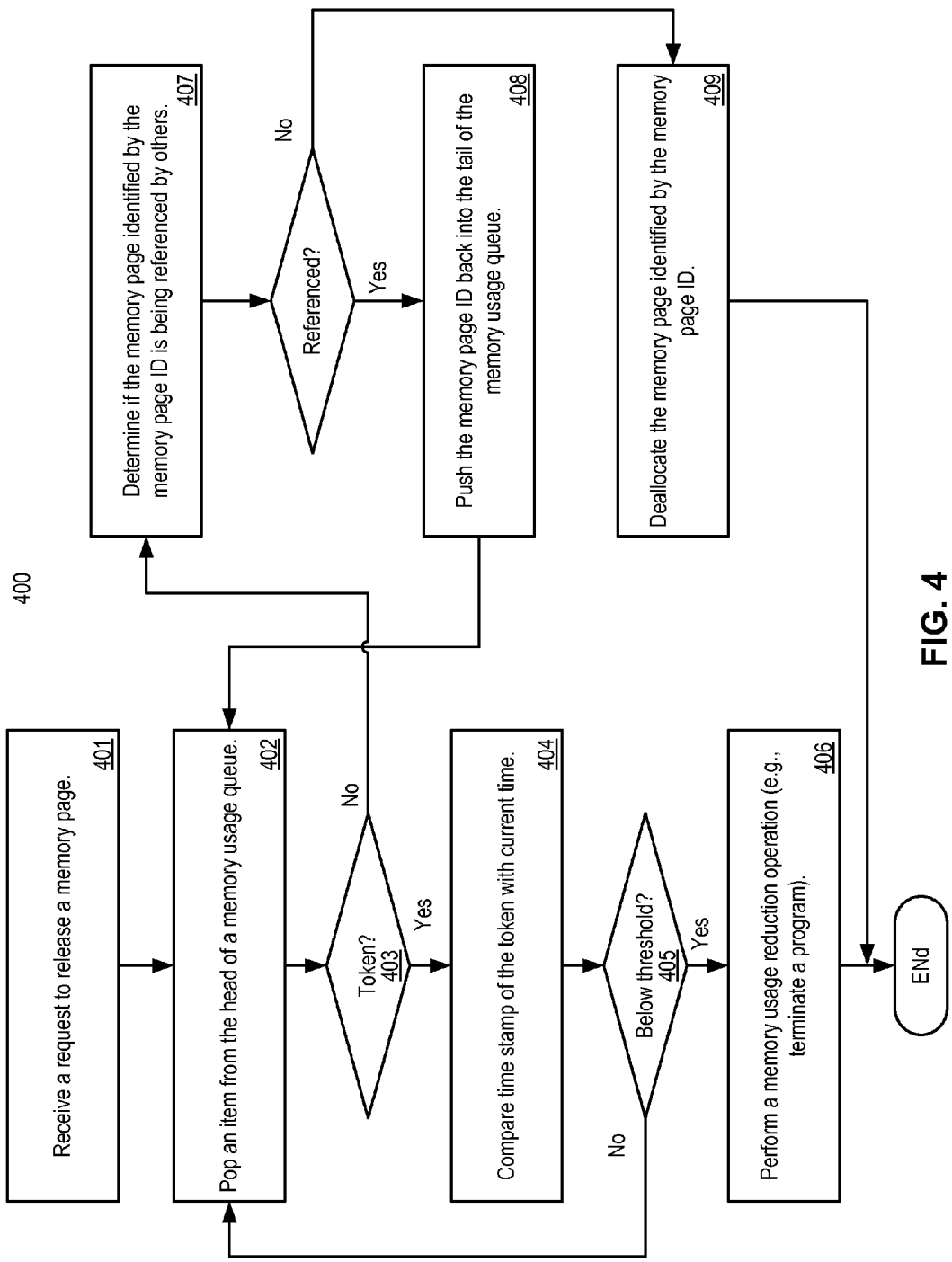
FIG. 4 is a flow diagram illustrating a method for resource management according to another embodiment of the invention.

FIG. 4 is a flow diagram illustrating a method for resource management according to another embodiment of the invention. Method 400 may be performed by system 100 or system 200 of FIGS. 1 and 2. Referring to FIG. 4, at block 401, a request to release a memory page is received. Such a request may be received when the amount of free memory pages available drops below a predetermined threshold. At block 402, processing logic pops an item from a memory usage queue, where the item may be a token or a memory page ID. If it is determined that the item is a token at block 403, processing logic compares the timestamp of the token with the current time at block 404. If a difference between the timestamp and the current time is below a predetermined threshold at block 405, a memory usage reduction operation is performed at block 406. For example, a program that is running may be terminated and the associated memory may be released. If the difference between the timestamp and the current time is greater than the predetermined threshold, a next item is popped from the memory usage queue. If the item is not a token (e.g., a memory page ID), at block 407, processing logic determines whether the memory page identified by the memory page ID is being referenced by others (e.g., in a referenced state or dirty state). If so, at block 408, the memory page ID is then inserted back to the memory usage queue and a next item is popped from the memory usage queue. If the memory page is not being referenced, at block 409, the memory page is released back to the free memory pool.

Figure 5:
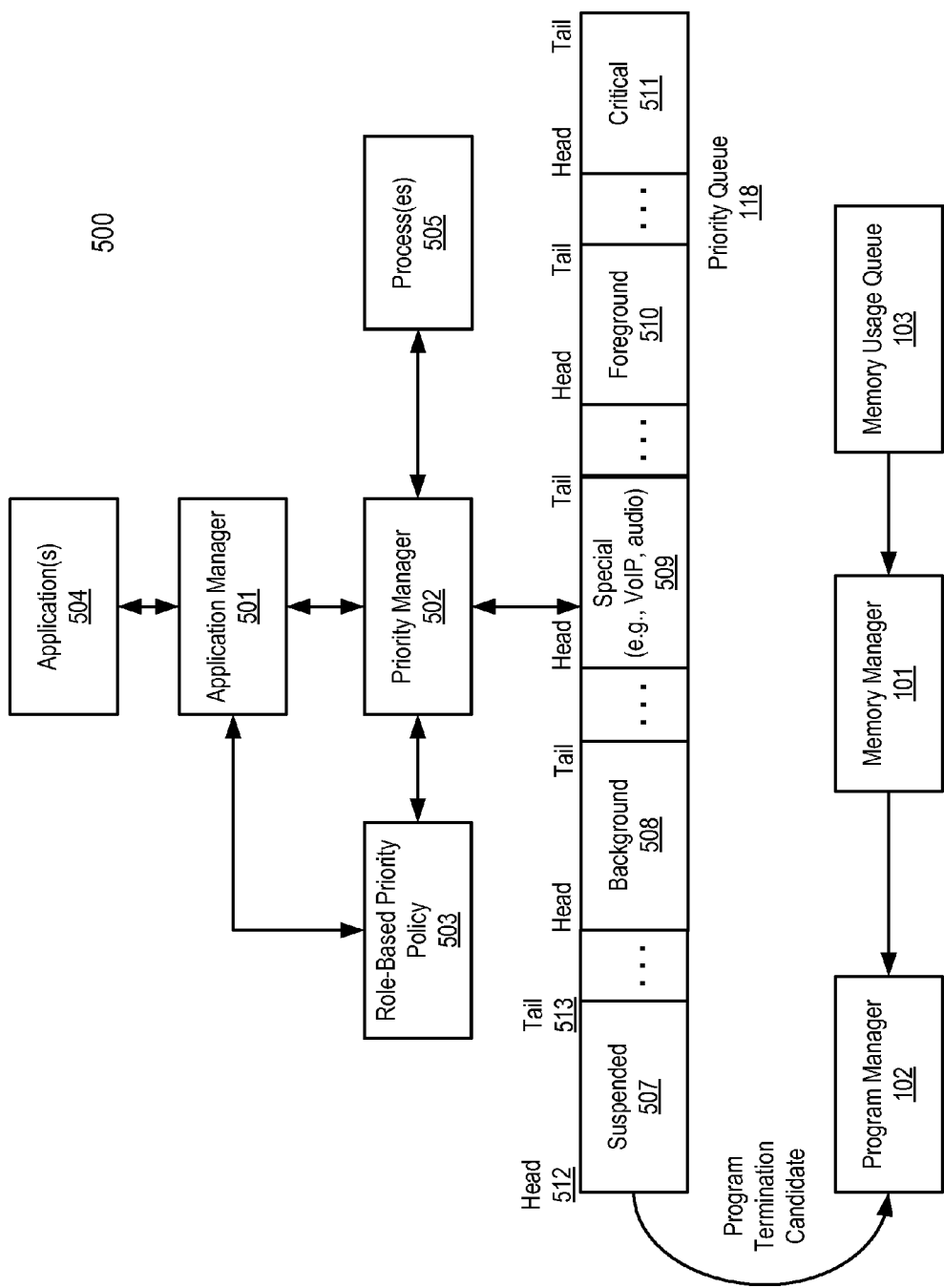
FIG. 5 is a block diagram illustrating a system for resource management according to another embodiment of the invention.

FIG. 5 is a block diagram illustrating a system for resource management according to another embodiment of the invention. Referring to FIG. 5, system 500 may be implemented in conjunction with system 100 or 200 of FIGS. 1-2. Referring to FIG. 5, system 500 includes an application manager 501 and a priority manager 502. Application manager 501 is configured to manage applications 504. Priority manager 502 is configured to configure and manage the priorities of applications 504 and processes 505. Priority manager 502 maintains a priority queue 118 to store program IDs identifying applications 504 and processes 505. Each of the applications 504 and processes 505 is associated with a priority that is assigned by priority manager 502 and stored in one of priority bands 507-511 corresponding to the priority of the program.

According to one embodiment, when an application is launched by application manager 501, application 501 determines a role or roles of the application, where a role of an application defines what the application can or will perform, which may simply be an application type or functionalities of the application. Application manager 501 then communicates with priority manager 502. Based on the roles of the application, which may be provided by application manager 501, priority manager 502 determines a priority for the application based on the role or roles of the application in view of role-based priority policy or rules 503 and assigns the priority to the application. In addition, a program ID of the program is inserted into one of priority bands 507-511 based on its assigned priority. A program ID may represent a data structure or object having information describing the associated program, including the priority and the process ID of the associated program. Note that application manager 501 and priority manager 502 may be implemented as a single module.

According to one embodiment, process 505, which may be a system process such as a system daemon, communicates with priority manager 502 via a programming interface. Process 505 may request to have a certain priority to be assigned to it. In response to the request, priority manager 502 communicates the kernel, such as the authorization source of the operating system, to retrieve entitlement associated with process 505. The entitlement may define functionality or resources process 505 is entitled to request or to utilize during the execution, where the entitlement may be defined during the development of process 506. The entitlement of an application may be defined by an authority source associated with the system when the application was developed. The system may maintain a database (not shown) having the entitlement information stored therein for all applications installed in the system. The entitlement information can be obtained from a binary image of an application (e.g., header or metadata of the binary image, also referred to as a code signature) and compared with the corresponding entitlement information maintained by the system to determine whether a particular application is entitled to whatever (e.g., hardware and/or software resources) is requested by the application.

For example, process 505 may inform priority manager 502 that it is entering an idle state. In response to the idle operating state, priority manager 502 may automatically determine a new priority for process 505 based on role-based priority policy 503. It is assumed that process 505 was running as a foreground process (or any other higher priority band) whose program ID was associated with foreground priority band 510. In this example, priority manager 502 may remove the program ID of process 505 from foreground priority band 510 and inserts it into suspended priority band 507. Similarly, when process 505 is invoked by the operating system to actively perform a task such as a monitoring task, process 505 may again inform priority manager 502 of the new role and the priority manager 502 may adjust its priority again accordingly (e.g., relocating the corresponding program ID from a lower priority band to a higher priority band).

According to one embodiment, application manager 501 may monitor the operating statuses of applications 504. When an application changes its operating status, application manager 501 may communicate with priority manager 502 concerning the status changes of the application. Priority manager 502 in turn automatically adjusts a priority of the application and updates a program ID of the application in a proper priority band of priority queue 118 accordingly. For example, it is assumed that an application was running at the background and a user brings it to the foreground and activates a keyboard to interact with the application. In this situation, application manager 501 detects such a change of operating states and informs priority manager 502 for the same. In response, priority manager 502 determines a new priority for the application and updates its program ID in priority queue 118 accordingly. Note that during all these operations, applications 504 and processes 505 may not be aware of what priorities they are associated with; they only need to inform the operating system what they are doing or will do in terms of functionalities and the system will automatically update their priorities. As described above, the priorities of programs are used by the operating system to determine a top candidate to be terminated or to reduce its memory usage. A lower priority program will be terminated before terminating a higher priority program.

In one embodiment, the priority queue 118 includes, from a high priority to a low priority, a critical priority band 511, foreground priority band 510, special priority band 509 (for special applications such as audio or voice application), background priority band 508, and suspended priority band 507. More or fewer priority bands may also be implemented. In one embodiment, each of priority bands 507-511 is implemented as a FIFO buffer having a head and a tail. A head of a higher priority band is coupled to a tail of an adjacent lower priority band. When a program ID is inserted into a priority band, the program ID is inserted into a tail of the priority band (e.g., tail 513). When program manager 102 receives a request to terminate a program or cause a program to reduce memory usage from memory manager 101, program manager 102 is configured to pops a program ID from a head of a priority band (e.g., head 512), starting the lowest priority band. Thus, a new program ID is always inserted into the tail of a priority band. As more new program IDs are inserted into the tail and more program IDs are popped from the head, a program ID eventually moves and arrives at the head of the priority band, unless the priority of the program changes before it arrives at the head. If a lower priority band does not contain any program ID, program manager 102 will continues walking up through a next higher priority band starting from the head of the next higher priority band, etc.

In this example as shown in FIG. 5, program manager 102 receives a signal from memory manager 101, where the signal is generated based on information obtained from memory usage queue 103 as described above. In response to the signal, program manager 102 pops a program ID from head 512 of suspended priority band 507, i.e., the lowest priority band in this example. Program manager 102 then terminates the corresponding program or causes the program to reduce its memory consumption. If suspended priority band 507 does not contain any program ID or more memory pages need to be freed up, program manager 102 may continue walking up the chain towards a higher priority band. In one embodiment, priority queue 118 may be implemented in a variety of data structures. For example, priority queue 118 may be implemented as a linked list (e.g., a single linked list) having a single head pointer, with each node representing a priority band and pointing to a next node. An insertion happens by a linear search, such that an entry is inserted to prior to an existing entry of a lower priority. Note that program manager 102, application manager 501, and/or priority manager 502 may be implemented as a single module.

Figure 6:
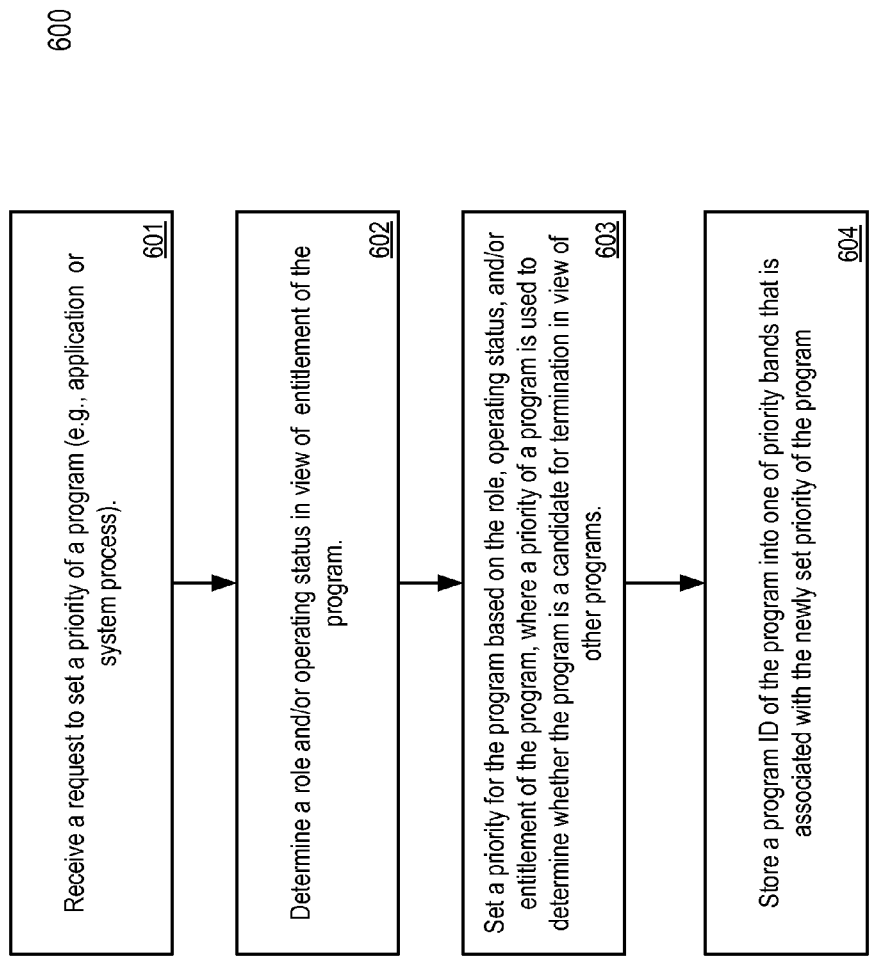
FIG. 6 is a flow diagram illustrating a method for managing priorities of programs according to one embodiment of the invention.

FIG. 6 is a flow diagram illustrating a method for managing priorities of programs according to one embodiment of the invention. Method 600 may be performed by system 500 of FIG. 5. Referring to FIG. 6, at block 601, a request is received to set a priority of a program (e.g., application or system process). At block 602, processing logic determines a role and/or operating status of the program, optionally in view of entitlement of the program. At block 603, a priority is determined and assigned to the program based on the role, operating status, and/or entitlement of the program. A priority of a program is utilized to determine whether the program is a candidate for termination or resource consumption reduction in view of other programs. At block 604, a program ID associated with the program is then stored in one of priority bands of a priority queue that is associated with the newly assigned priority of the program.

Figure 7:
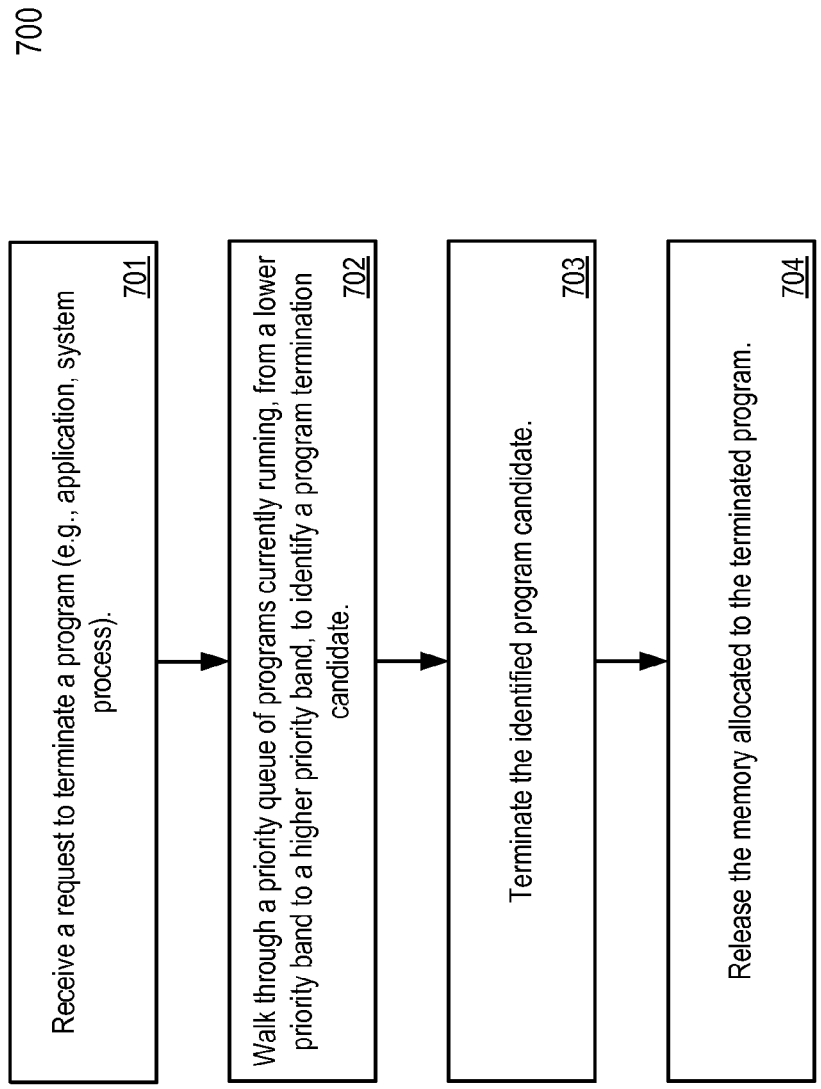
FIG. 7 is a flow diagram illustrating a method for resource consumption reduction based on priorities according to one embodiment of the invention.

FIG. 7 is a flow diagram illustrating a method for resource consumption reduction based on priorities according to one embodiment of the invention. Method 700 may be performed by system 500 of FIG. 5. Referring to FIG. 7, at block 701, a request is received to terminate a program in order to free up memory. At block 702, processing logic walks through a priority queue storing program IDs identifying programs currently running within a data processing system, starting from a lower priority band to a higher priority band, to identify a program candidate for termination. In one embodiment, processing logic pops a program ID from a head of a priority band and terminates the program identified by the program ID at block 703. Thereafter, the resources such as memory associated with the terminated program are released at block 704.

Figure 8:
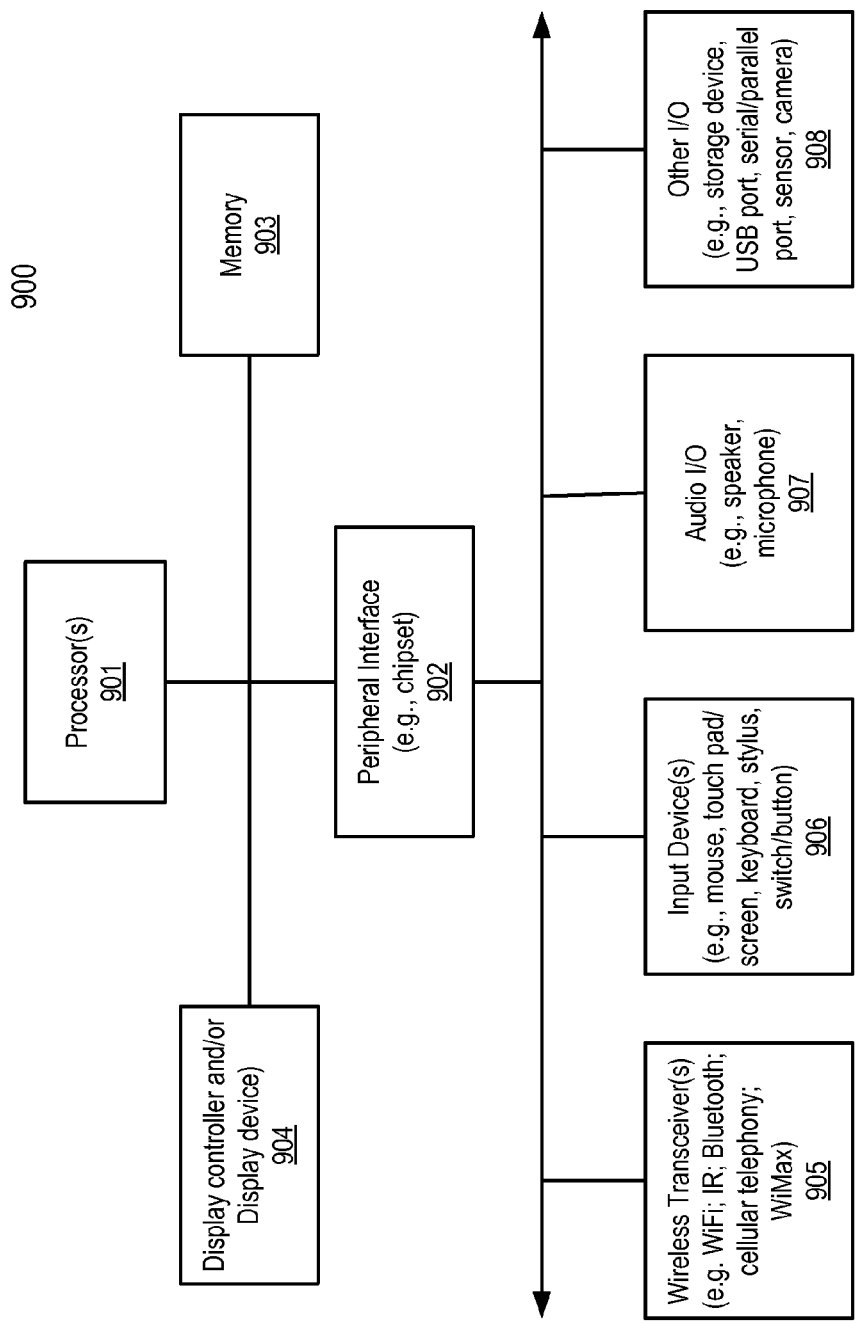
FIG. 8 is a block diagram illustrating an example of a data processing system which may be used with one embodiment of the invention.

FIG. 8 is a block diagram illustrating an example of a data processing system which may be used with one embodiment of the invention. For example, system 900 may represents any of data processing systems described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 8, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 8 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for resource management of a data processing system, the method comprising:

periodically pushing a token into a memory usage queue, the token including a timestamp indicating time entering the memory usage queue, wherein the memory usage queue stores a plurality of memory page identifiers (IDs) identifying a plurality of memory pages currently allocated to a plurality of programs running within the data processing system, wherein at least two of the memory pages are allocated to different ones of the programs;

in response to a request to reduce memory usage, popping a token from the memory usage queue;

comparing a timestamp of the popped token with current time to determine whether a difference between the timestamp and the current time is below a predetermined threshold; and performing a memory usage reduction action on at least one of the programs if the difference is below the predetermined threshold.

2. The method of claim 1, wherein the pushed token is periodically pushed into a tail of the memory usage queue, and wherein the popped token is popped from a head of the memory usage queue in response to the request to reduce memory usage.

3. The method of claim 1, further comprising:
in response to a request to allocate a memory page for a program, allocating a first memory page from a pool of free memory pages to the program; and
pushing a first memory ID identifying the allocated first memory page into a tail of the memory usage queue.

4. The method of claim 3, further comprising:
popping a second memory page ID from a head of the memory usage queue in response to the request to reduce memory usage;
determining whether a second memory page identified by the second memory page ID is currently referenced by a program; and
releasing the second memory page back to the pool of free memory pages if the second memory page is not currently referenced.

5. The method of claim 4, further comprising pushing the second memory page ID back into the tail of the memory usage queue if the second memory page is currently referenced.

6. The method of claim 1, wherein performing a memory usage reduction action comprises:
releasing one or more memory pages that were allocated to the at least one program back to a pool of free memory pages.

7. The method of claim 6, wherein performing a memory usage reduction action comprises:
popping a program identifier from a priority queue, the priority queue storing a plurality of program identifiers identifying the plurality of programs and each program being associated with a priority, wherein a program identified by the popped program identifier has the lowest priority amongst the programs; and
terminating the program identified by the popped program identifier.

8. The method of claim 7, wherein the priority queue comprises a plurality of priority bands, each band being associated with a different priority, and wherein a program identifier of each of the plurality of program is placed in one of the priority bands based on a role of the program.

9. A non-transitory computer-readable medium having instructions stored therein, which when executed by a processor, cause the processor to perform a method for resource management of a data processing system, the method comprising:

periodically pushing a token into a memory usage queue, the token including a timestamp indicating time entering the memory usage queue, wherein the memory usage queue stores a plurality of memory page identifiers (IDs) identifying a plurality of memory pages currently allocated to a plurality of programs running within the data processing system, wherein at least two of the memory pages are allocated to different ones of the programs;

in response to a request to reduce memory usage, popping a token from the memory usage queue;

comparing a timestamp of the popped token with current time to determine whether a difference between the timestamp and the current time is below a predetermined threshold; and performing a memory usage reduction action on at least one of the programs if the difference is below the predetermined threshold.

10. The non-transitory computer-readable medium of claim 9, wherein the pushed token is periodically pushed into a tail of the memory usage queue, and wherein the popped token is popped from a head of the memory usage queue in response to the request to reduce memory usage.

11. The non-transitory computer-readable medium of claim 9, wherein the method further comprises:
in response to a request to allocate a memory page for a program, allocating a first memory page from a pool of free memory pages to the program; and
pushing a first memory ID identifying the allocated first memory page into a tail of the memory usage queue.

12. The non-transitory computer-readable medium of claim 11, wherein the method further comprises:
popping a second memory page ID from a head of the memory usage queue in response to the request to reduce memory usage;
determining whether a second memory page identified by the second memory page ID is currently referenced by a program; and
releasing the second memory page back to the pool of free memory pages if the second memory page is not currently referenced.

13. The non-transitory computer-readable medium of claim 12, wherein the method further comprises pushing the second memory page ID back into the tail of the memory usage queue if the second memory page is currently referenced.

14. The non-transitory computer-readable medium of claim 9, wherein the method further comprises
releasing one or more memory pages that were allocated to the at least one program back to a pool of free memory pages.

15. The non-transitory computer-readable medium of claim 14, wherein performing a memory usage reduction action comprises:
popping a program identifier from a priority queue, the priority queue storing a plurality of program identifiers identifying the plurality of programs and each program being associated with a priority, wherein a program identified by the popped program identifier has the lowest priority amongst the programs; and
terminating the program identified by the popped program identifier.

16. The non-transitory computer-readable medium of claim 15, wherein the priority queue comprises a plurality of priority bands, each band being associated with a different priority, and wherein a program identifier of each of the plurality of program is placed in one of the priority bands based on a role of the program.

17. A data processing system, comprising:
a processor; and
a memory coupled to the processor for storing instructions, which when execute from the memory, cause the processor to perform operations for resource management, the operations including
   periodically pushing a token into a memory usage queue, the token including a timestamp indicating time entering the memory usage queue, wherein the memory usage queue stores a plurality of memory page identifiers (IDs) identifying a plurality of memory pages currently allocated to a plurality of programs running within the data processing system, wherein at least two of the memory pages are allocated to different ones of the programs,
   in response to a request to reduce memory usage, popping a token from the memory usage queue,
   comparing a timestamp of the popped token with current time to determine whether a difference between the timestamp and the current time is below a predetermined threshold, and
   performing a memory usage reduction action on at least one of the programs if the difference is below the predetermined threshold.

18. The system of claim 17, wherein the pushed token is periodically pushed into a tail of the memory usage queue, and wherein the popped token is popped from a head of the memory usage queue in response to the request to reduce memory usage.

19. The system of claim 17, wherein the operations further comprise:
   in response to a request to allocate a memory page for a program, allocating a first memory page from a pool of free memory pages to the program; and
   pushing a first memory ID identifying the allocated first memory page into a tail of the memory usage queue.

20. The system of claim 19, wherein the operations further comprise:
   popping a second memory page ID from a head of the memory usage queue in response to the request to reduce memory usage;
   determining whether a second memory page identified by the second memory page ID is currently referenced by a program; and
   releasing the second memory page back to the pool of free memory pages if the second memory page is not currently referenced.

21. The system of claim 20, wherein the operations further comprise pushing the second memory page ID back into the tail of the memory usage queue if the second memory page is currently referenced.

22. The system of claim 17, wherein performing a memory usage reduction action comprises
   releasing one or more memory pages that were allocated to the at least one program back to a pool of free memory pages.

23. The system of claim 22, wherein performing a memory usage reduction action comprises:
   popping a program identifier from a priority queue, the priority queue storing a plurality of program identifiers identifying the plurality of programs and each program being associated with a priority, wherein a program identified by the popped program identifier has the lowest priority amongst the programs; and
   terminating the program identified by the popped program identifier.

24. The system of claim 23, wherein the priority queue comprises a plurality of priority bands, each band being associated with a different priority, and wherein a program identifier of each of the plurality of program is placed in one of the priority bands based on a role of the program.

* * * * *